US012632098B2

(12) United States Patent
Subramanian et al.

(10) Patent No.: US 12,632,098 B2
(45) Date of Patent: May 19, 2026

(54) METHODOLOGY FOR vRAN POWER SAVINGS BASED ON PROJECTED COMPUTATION LOAD

(71) Applicant: Intel Corporation, Santa Clara, CA (US)

(72) Inventors: Sumesh Subramanian, Santa Clara, CA (US); Thushara Hewavithana, Tempe, AZ (US); Chengyu Liu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/561,302

(22) PCT Filed: Dec. 9, 2021

(86) PCT No.: PCT/CN2021/136661
§ 371 (c)(1),
(2) Date: Nov. 16, 2023

(87) PCT Pub. No.: WO2023/102803
PCT Pub. Date: Jun. 15, 2023

(65) Prior Publication Data
US 2024/0370075 A1     Nov. 7, 2024

(51) Int. Cl.
G06F 1/00          (2006.01)
G06F 1/3234        (2019.01)
(Continued)

(52) U.S. Cl.
CPC ............ G06F 1/3234 (2013.01); H04L 41/40 (2022.05); H04W 72/0446 (2013.01)

(58) Field of Classification Search
CPC ..... G06F 1/3234; G06F 9/5094; H04L 41/40; H04W 72/0446; Y02D 10/00
See application file for complete search history.

(56) References Cited

U.S. PATENT DOCUMENTS

| | | | | |
|---|---|---|---|---|
| 8,892,931 | B2 * | 11/2014 | Kruglick | ............... G06F 1/3203 |
| | | | | 713/340 |
| 11,842,202 | B2 * | 12/2023 | Rajagopal | ............. G06F 1/3296 |

(Continued)

FOREIGN PATENT DOCUMENTS

| | | |
|---|---|---|
| CN | 112632155 A | 4/2021 |
| WO | 2021242388 A1 | 12/2021 |

OTHER PUBLICATIONS

International Search Report issued for the corresponding PCT patent application No. PCT/CN2021/136661, dated Aug. 18, 2022, 3 pages (For informational purposes only).
(Continued)

*Primary Examiner* — Xuxing Chen
(74) *Attorney, Agent, or Firm* — Viering, Jentschura & Partner mbB

(57)          ABSTRACT

A mobile communication device including a processor configured to obtain a data packet scheduling information; determine a computation load of a packet processing pipeline based on the data packet scheduling information; generate a power consumption profile of the processor based on the computation load; and control a plurality of cores of the processor based on the power consumption profile.

20 Claims, 12 Drawing Sheets

(51) Int. Cl.
    *H04L 41/40*     (2022.01)
    *H04W 72/0446*     (2023.01)

(56) References Cited

U.S. PATENT DOCUMENTS

| | | | |
|---|---|---|---|
| 2013/0318379 A1* | 11/2013 | Seshadri | G06F 1/206 |
| | | | 713/320 |
| 2015/0355700 A1* | 12/2015 | Pusukuri | G06F 1/324 |
| | | | 713/323 |
| 2019/0199602 A1* | 6/2019 | Zhang | H04L 41/147 |
| 2019/0319868 A1* | 10/2019 | Svennebring | H04W 24/08 |
| 2019/0369706 A1* | 12/2019 | Dokku | G06F 9/3004 |
| 2020/0218676 A1* | 7/2020 | Cao | G06F 9/5027 |
| 2020/0296741 A1 | 9/2020 | Ayala Romero et al. | |
| 2021/0075730 A1 | 3/2021 | Palermo et al. | |
| 2023/0217253 A1* | 7/2023 | Palermo | H04W 12/125 |
| | | | 726/23 |

OTHER PUBLICATIONS

Extended European search report issued for the corresponding European patent application No. 21966726.8, dated Jul. 18, 2025, 9 pages (for informational purposes only).
Jignesh S Panchal et al., Enabling and 1-15 INV.Scaling of URLLC Verticals on 5G vRAN G06F9/50 Running on COTS Hardware, IEEE Communications Magazine, IEEE Service Center, Piscataway, US, vol. 59, No. 9, Oct. 11, 2021, pp. 105-111.

* cited by examiner

From Scheduler

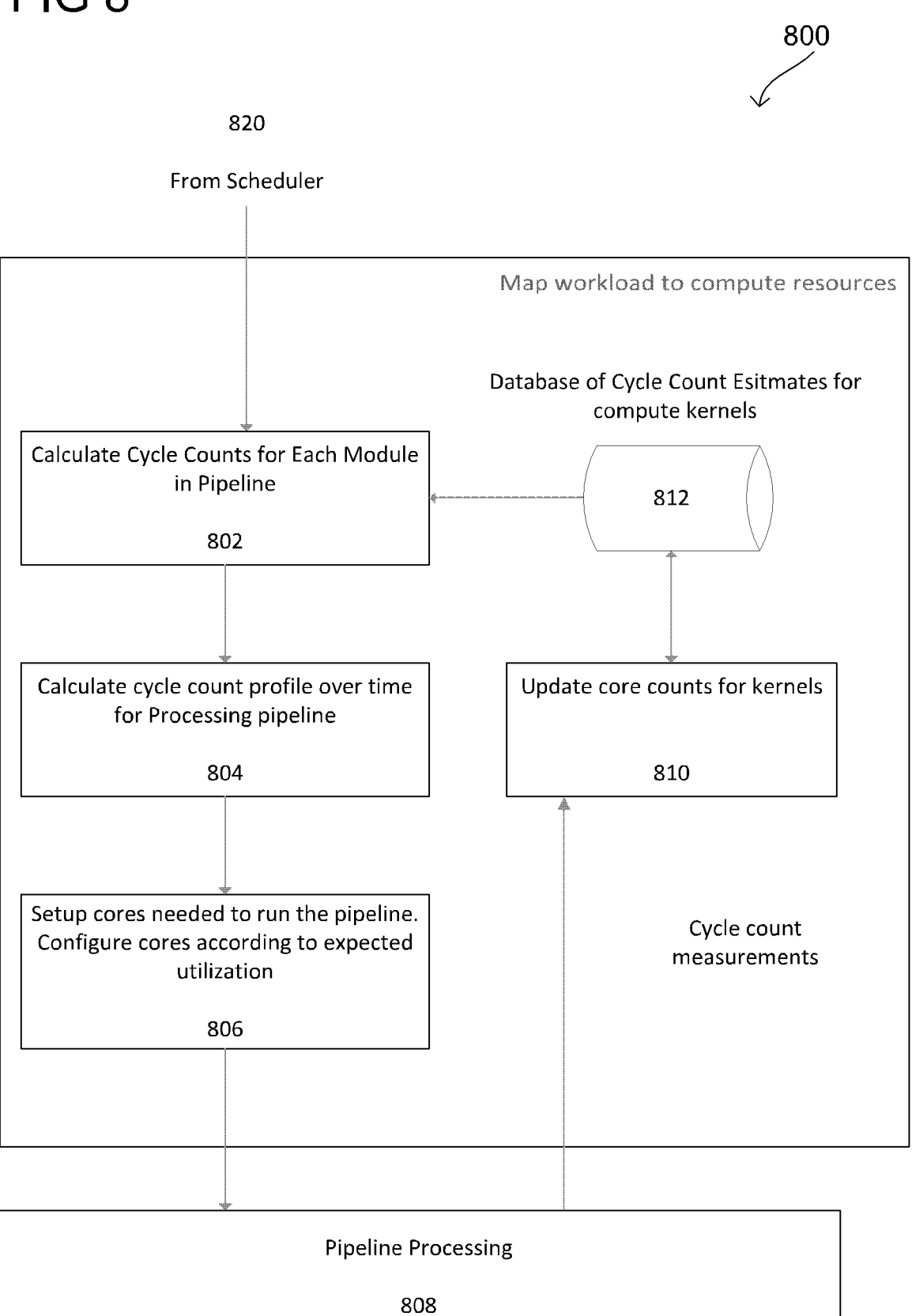

Map workload to compute resources

Database of Cycle Count Esitmates for compute kernels

Calculate Cycle Counts for Each Module in Pipeline

802

812

Calculate cycle count profile over time for Processing pipeline

804

Update core counts for kernels

810

Setup cores needed to run the pipeline. Configure cores according to expected utilization

806

Cycle count measurements

Pipeline Processing

808

900

| | Active state | | |
|---|---|---|---|
| | 902 | 904 | 906 |
| Core voltage* | [high] | [high] | [low] |
| Core clock | ⊓⊔ | off | off |
| PLL | ⊓⊔ | ⊓⊔ | off |
| L1/L2 caches | [on] | [on] | [retention] |
| LLC/L3 cache | [on] | [on] | [on] |
| Wakeup time* | Active | [short] | [long] |
| Idle power* | Active | [high] | [low] |
| Transition energy* | Active | [low] | [medium] |
| * Rough approximation | | | |

1100

1200

1202 — Obtaining a data packet scheduling information.

1204 — Determining a computation load of a packet processing pipeline based on the data packet scheduling information.

1206 — Generating a power consumption profile of the processor based on the computation load.

1208 — Controlling a plurality of cores of the processor based on the power consumption profile.

METHODOLOGY FOR vRAN POWER SAVINGS BASED ON PROJECTED COMPUTATION LOAD

RELATED APPLICATIONS

This application is a US National Stage Application of International Application PCT/CN2021/136661, filed on 9 Dec. 2021, the contents of which are incorporated herein by reference in its entirety.

TECHNICAL FIELD

This disclosure generally relates to methods and devices for reducing power consumption in a virtualized radio access network (vRAN).

BACKGROUND

Wireless Network operators are investing heavily in vRAN solutions with 5G. Over the last few years, there have been a few "at scale" brown field and green field deployments that span multiple large cities. Today's vRAN solutions may have a central processing unit (CPU), several network interface controllers (NICs), and a peripheral component interconnect express (PCIE) accelerator card to handle the RAN functions. As this deployment is evolving and operators implement vRAN solutions for their networks, power consumption of the platform is becoming a key focus point. vRAN solutions are always compared against custom system on chip (SoC) based solutions and power is always a differentiating factor. vRAN solutions may require 2-10 times more power than SoC vRAN based solutions.

This disclosure includes a system level framework, which leverages some software techniques using hardware capabilities to address this power consumption issue. The techniques discussed here may exploit knowledge of the RAN traffic patterns and use them to save power without affecting real-time performance of the solution. Based on the traffic patterns power saving capabilities of the CPU may be leveraged to reduce power consumption.

Data from the data link layer (DLL), or layer 2, such as scheduling information is readily available at a system level. The framework may use data from the DLL to project the expected computation load at a fine time granularity. In case of vRAN, this fine time granularity may be at the granularity of the duration of a time slot, or time transmission interval (TTI) basis. vRAN solutions may be implemented on a cross architecture processing unit (XPU). The projected computation load defined at a fine time granularity can be used to drive the setting of power saving modes of XPUs at the same fine time granularity. By setting power saving modes at the same fine time granularity as the computation load of processing data packets, the cores of the XPU are only active when they are required to process data packets. Therefore, the power consumption profile of the XPU closely matches estimated computation load profile over time. This fine grain power optimization can save power even during busy hours by taking advantage of finer variations in network capacity use.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. In the following description, various embodiments of the present disclosure are described with reference to the following drawings, in which:

FIG. 8 shows a flowchart for implementing a power profile.

DESCRIPTION

Figure 1:
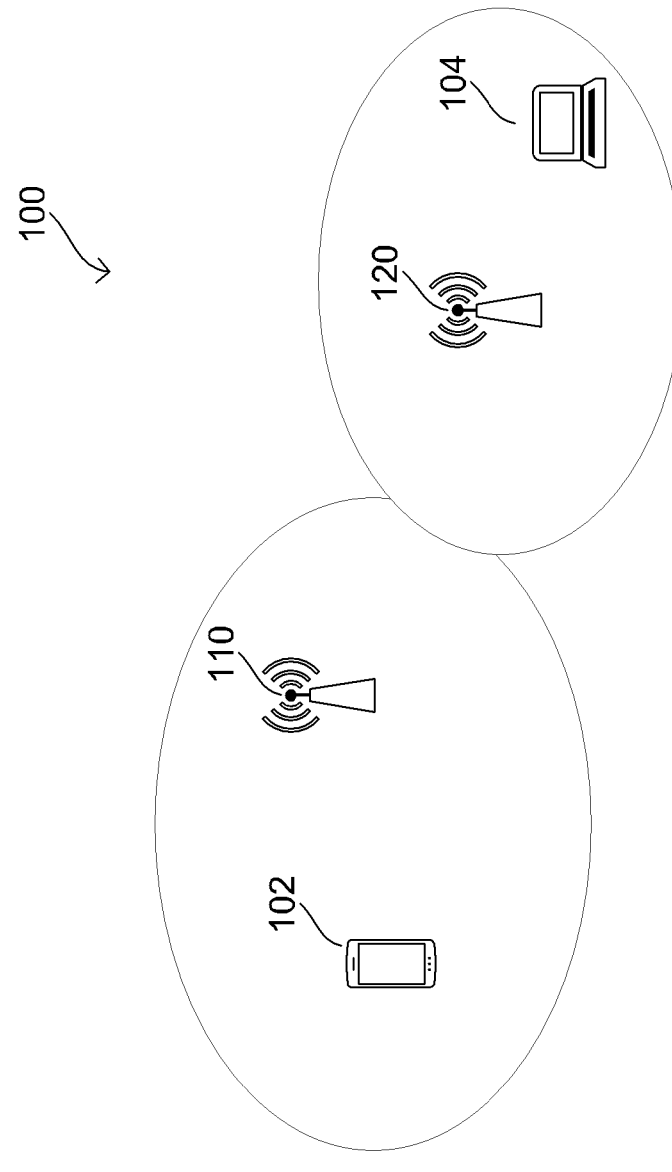
FIG. 1 shows a radio communication network.

The following detailed description refers to the accompanying drawings that show, by way of illustration, specific details in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Examples of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs (gNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

The term "power amplifier (PA) device" may be used to describe a unit cell power amplifier or a slice of unit cell power amplifier.

This disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

Figure 2:
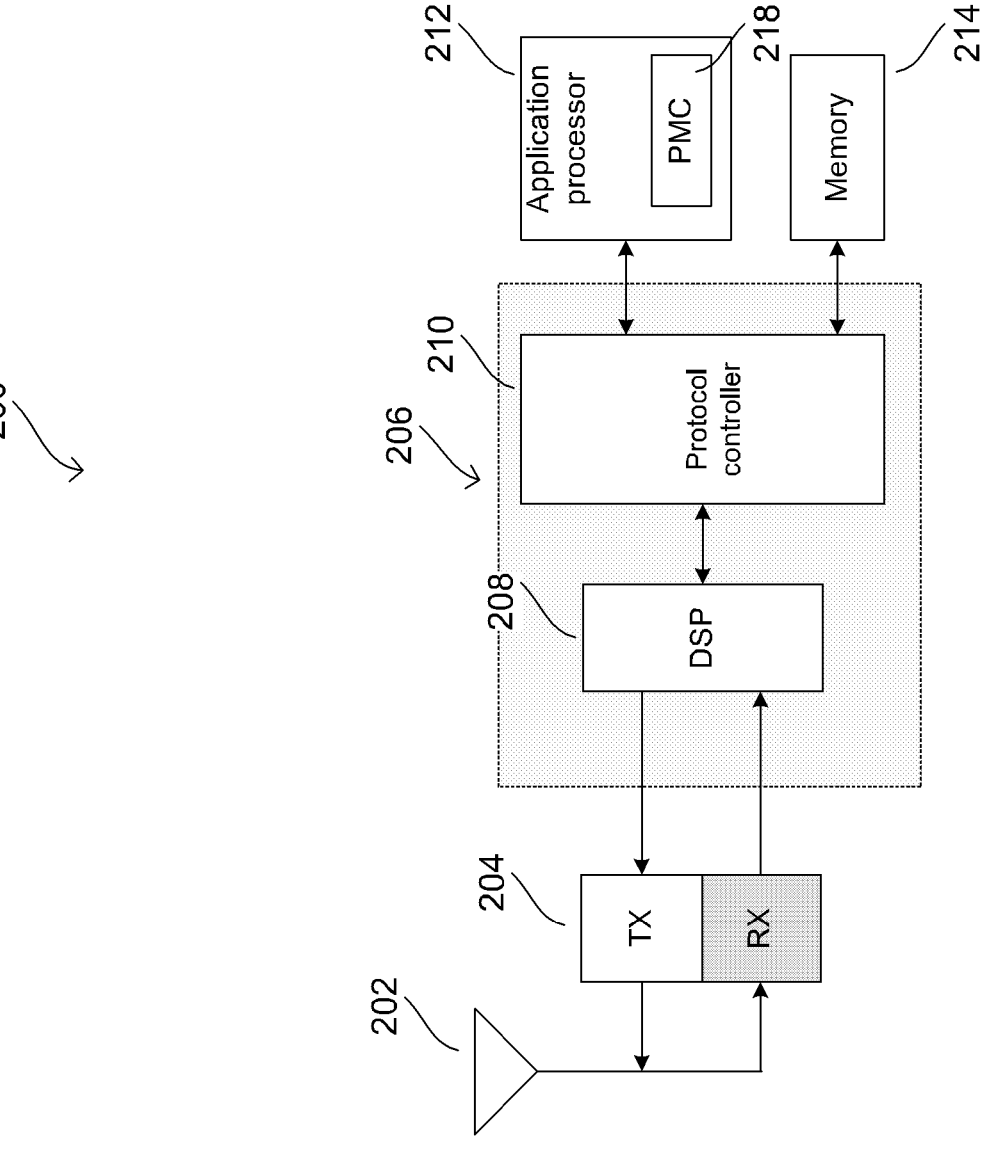
FIG. 2 shows an internal configuration of a terminal device.

FIGS. 1 and 2 show a general network and device architecture for wireless communications. FIG. 1 shows exemplary radio communication network 100, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks. In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

FIG. 2 shows an exemplary internal configuration of terminal device 200, which may include antenna system 202, radio frequency (RF) transceiver 204, baseband modem 206 (including digital signal processor 208 and protocol controller 210), application processor 212, and memory 214. Terminal device 200 may be any one of terminal device 102 or 104. Although not explicitly shown in FIG. 2, terminal device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 200 shown in FIG. 2 depicts only a single instance of such components.

Terminal device 200 may transmit and receive wireless signals with antenna system 202. Antenna system 202 may be a single antenna or may include one or more antenna arrays that each include multiple antenna elements. For example, antenna system 202 may include an antenna array at the top of terminal device 200 and a second antenna array at the bottom of terminal device 200. Antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAS)), filters, RF modulators (e.g., RF IQ modulators)), and digital-to-analog converters (DACs), which RF transceiver 204 may utilize to mix the digital baseband samples received from baseband modem 206 and produce the analog radio frequency signals for wireless transmission by antenna system 202. Baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. Digital signal processor 208 may include one or more processors configured to retrieve and execute program code that defines control and processing logic for physical layer processing operations. Digital signal processor 208 may execute processing functions with software via the execution of executable instructions. Digital signal processor 208 may include one or more dedicated hardware circuits (e.g., ASICs, FPGAs, and other hardware) that are digitally configured to specifically execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. The processor and hardware accelerator components of digital signal processor 208 may be realized as a coupled integrated circuit.

Terminal device 200 may be configured to operate according to one or more radio communication technologies. Digital signal processor 208 may be responsible for lower-layer processing functions (e.g. Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 200 may also include application processor 212 and memory 214. Application processor 212 may be a CPU, and may be configured to handle the layers above the protocol stack, including the transport and application layers. Application processor 212 may be configured to execute various applications and/or programs of terminal device 200 at an application layer of terminal device 200, such as an operating system (OS), a user interface (UI) for supporting user interaction with terminal device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory circuitry or storage element of terminal device 200, such as a hard drive or another such permanent memory device. Although not explicitly depicted in FIG. 2, the various other components of terminal device 200 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 120. If the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

This disclosure provides various devices and methods for reducing power consumption of a general purpose processor, such as an XPU, within a virtualized Radio Access Network (vRAN). For example, this disclosure proves devices and methods for activating and deactivating processor cores based on a predicted load computation. Software may use available data, such as layer 2 scheduling information which is readily available at a system level, to predict the expected computation load. The available data may include a fine time granularity, such as the number of data packets processed per time slot or TTI. The projected computation load may drive the setting of power saving modes of an XPU at the same fine time granularity as the scheduling information. For example, data processed per time slot.

Many network operators are embracing a shift to virtualized Radio Access Networks that run baseband unit (BBU) features in virtual machines (VMs) on industry-standard, commercial off-the-shelf (COTS) servers. This change is a transition away from traditional RANs using dedicated hardware located in a central location.

By using a common hardware platform across the network, the same software code base can be used regardless of the location of the vRAN, giving Communications Service Providers (CoSPs) high levels of deployment flexibility and software reusability. Additionally, network services can be changed or upgraded quickly, enhancing the customer experience and shortening the time-to-market for new services. A vRAN provides dynamic scalability to increase or decrease capacity based on the volume of load traffic in the network.

A vRAN platform may include of a general purpose central processing unit (CPU), a network interface controller (NIC), one or more PCIE cards, one or more fans, one or more power units, a digital disk recorder (DDR), a hard disk drive (HDD), etc. The CPU may contribute to roughly 50% or more of the total power consumption. It is also the greatest source of heat on the vRAN platform, which leads to increased fan speed, which further increases the overall platform power consumption. Therefore, reducing the CPU power consumption has the greatest impact on the overall vRAN platform power consumption. One way to accomplish a reduction in power consumption is by leveraging built in power reduction techniques of a CPU.

Both vRAN operators and software vendors may benefit from vRAN power saving techniques. Operators can reduce OPEX (operating expense) when a vRAN platform consumes less power. Large vRAN operators may be able to save 1 million dollars a year based on a 1 Watt reduction in power. vRAN software vendors may be able to build differentiating solutions in the market space with a lower power footprint as compared to a traditional RAN using the same hardware.

In vRAN deployments, the RAN baseband can be separated into a vDU (virtualized distribution unit) and a vCU (virtualized centralized unit). The vDU may be deployed close to the air interface, to provide the service of the PHY (physical) layer, the MAC (media access control) layer, and the RLC (radio link control) layer. A vRAN operator may choose a vDU solution at a given site to provide sufficient wireless capacity during peak hours of the day. The layers of the vDU have tight and strict processing budgets for certain TTI (transmission time interval) traffic. For example, 500 μs in a 5G environment. To guarantee this kind of low-latency processing, software may allocate worker threads with a real-time policies and pin them to dedicated compute resources, such as processor cores. These threads may run in a polling mode to guarantee the processing latency, reduce packet drop rate and jitter. Such strict requirements may lead to higher power consumption of the platform. Because a vRAN physical layer (PHY) includes a complex math operation and the 3GPP protocol requires a low latency (500 μs for a narrow band spectrum), there is a lot of processing to do at short period of time.

Figure 3:
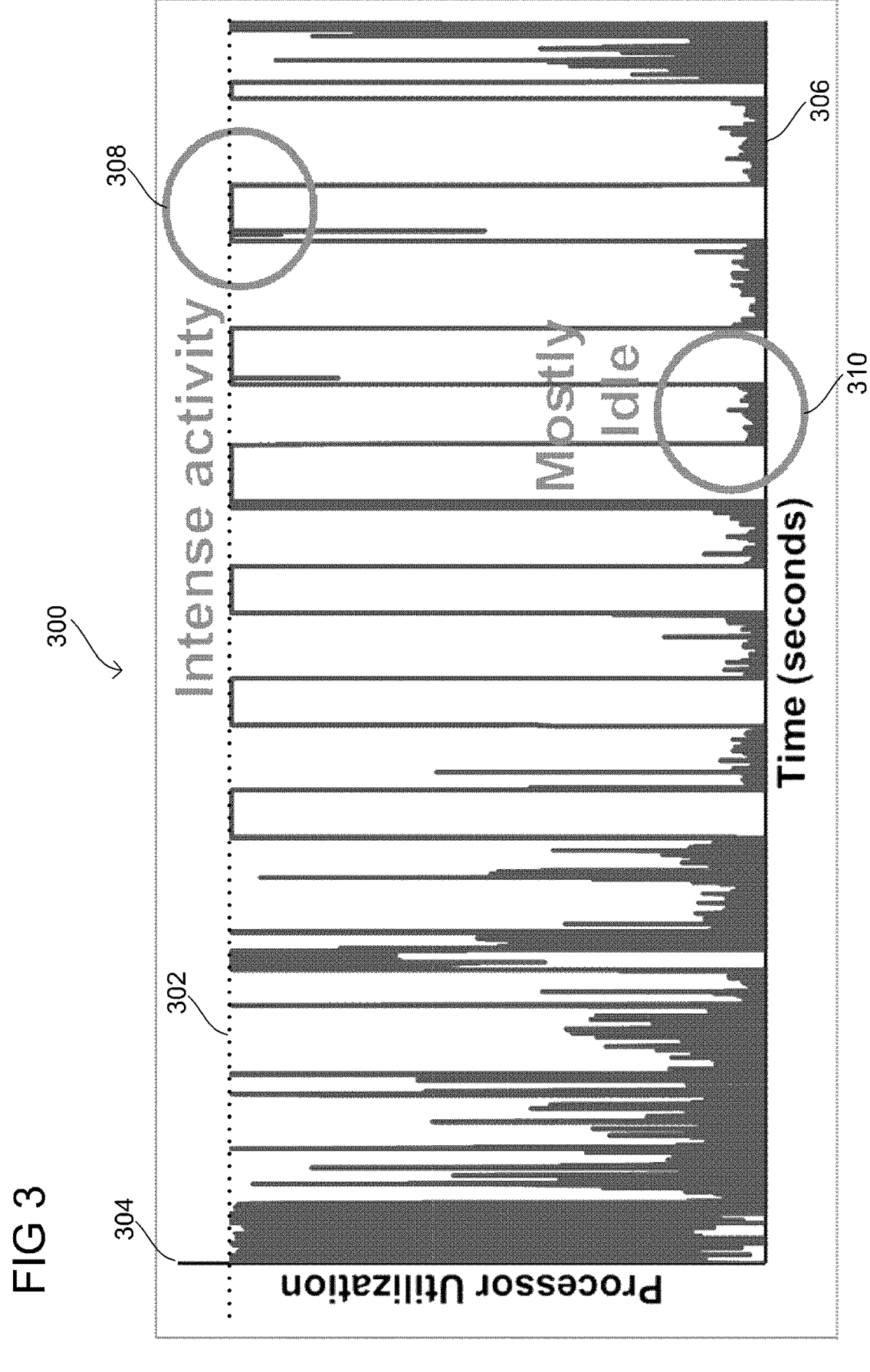
FIG. 3 shows a non-uniform workload of a RAN.

FIG. 3 shows a workload chart 300 representing a processor utilization over time for processing a data packet load in a vRAN. This workload has periods of high activity and periods of low activity. Chart 300 shows processor utilization on the y-axis 304 and time on the x-axis 306. Dotted line 302 may show the maximum processing capability. Time period 308 shows a period of high processing activity. For example, during time period 308, the processor may be working at maximum capacity with high processing at a low latency. Time period 310 shows a period of low processing activity. During time period 310, processing activity may be well below the maximum capacity of the processor. It may be desirable to deactivate cores of the processor of a vRAN platform during time period 310, and other times of low processing activity, to reduce power consumption.

Figure 4:
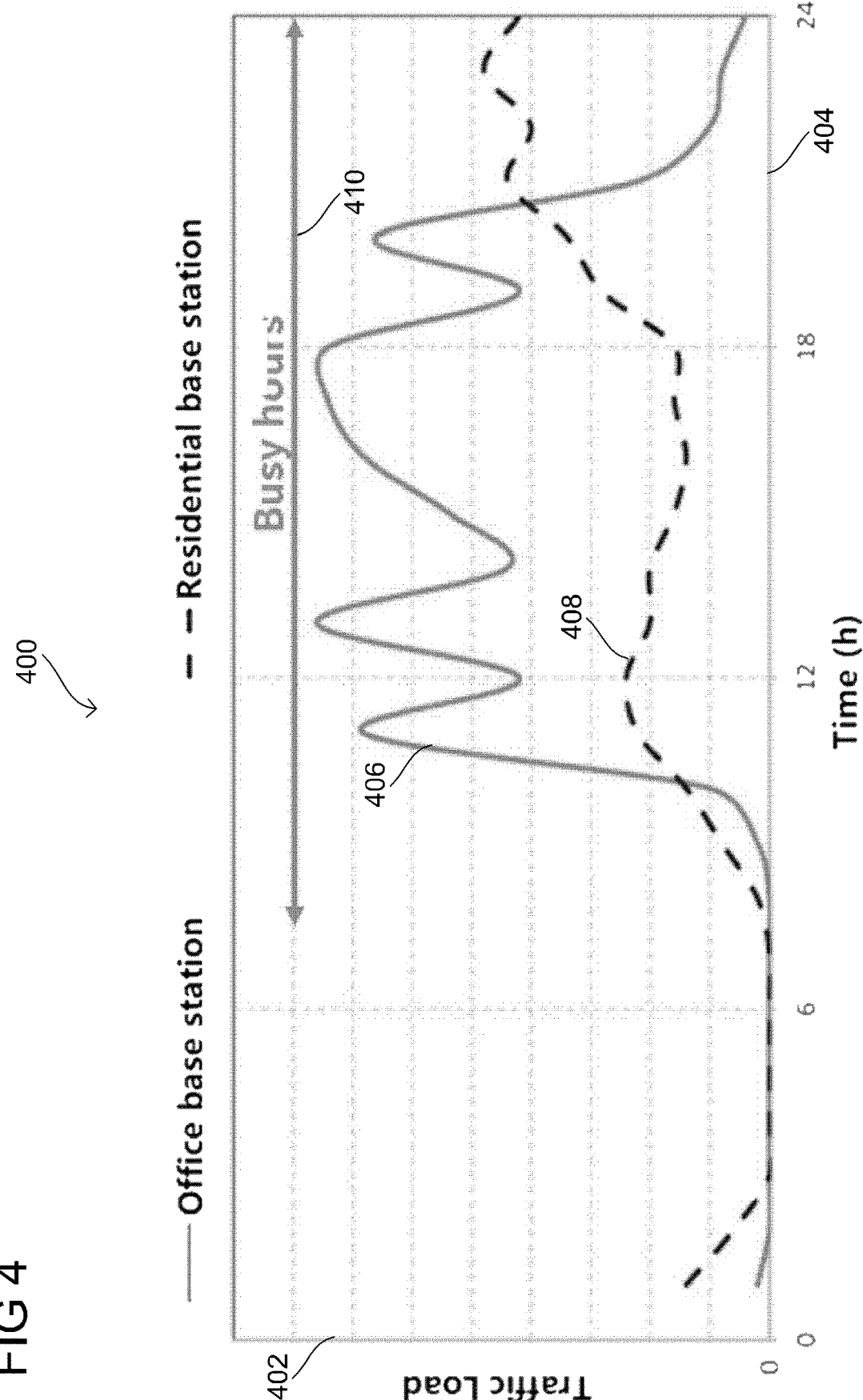
FIG. 4 shows traffic loads over peak and off-peak hours of a RAN.

FIG. 4 shows a chart 400 of a typical base station's network traffic pattern for a vRAN throughout a day. Chart 400 shows network traffic load on the y-axis 402 and time on the x-axis 404. Solid line 406 represents the traffic load for an office base station of a vRAN over time. Dashed line 408 represents the traffic load of a home residential base station of a vRAN over time. Time period 410 represents a busy time in which the office base station and/or the residential base station of a vRAN have a high traffic load. Time period 410 occupies roughly half of the 24 hour day. It may be desirable to deactivate, or put to sleep, cores of the processor of a vRAN platform outside of time period 410 to reduce power consumption. A software solution provider may develop one or more schemes to optimize the solution for reduced power consumption during both peak and off-peak hours.

During off-peak hours, one could start to consolidate processing activity to fewer cores and put un-used cores into a sleep mode thus reducing power drawn by the platform. This is a generally slow process and bringing the cores back online could be in the order of 100's of milli-seconds. This may be desirable when cores may be deactivated for longer periods of time.

During peak hours, this kind of technique cannot be used as there could be variations in throughput and traffic on a TTI-to-TTI basis. TTI may be in the order of 125-1000 micro-seconds, which may be shorter than required to activate a core in sleep mode. The software cannot afford to lose the cores for such extended periods of time as it will affect the vRAN solution performance and may not hit the required key performance indicators (KPIs) of a vRAN operator.

Processors may include an advanced configuration and power interface (ACPI) or other interface to discover and configure processor power management. For example, a processor may include power saving states. These states may include instructions that can be executed from the application space which allows the cores to go into a sleep state instantaneously without losing the state of cache of the core. Software may use a TTI-to-TTI level core sleep scheme in a PHY application to control processor cores based on real-time slot configuration and user schedule information from the MAC layer. This control may be implemented on a per core basis and the sleep time period can be flexibly set according to workload scheduled by a MAC layer schedular on each TTI. vRAN software solution providers may include machine learning techniques into an application to strategically send cores to sleep without affecting the RAN cycle count or latency performance. Therefore, reducing total power consumption by the vRAN platform. This kind of technique may also be fully automated within the application and be scalable and portable.

vRAN software applications may use MAC layer user scheduling information to predict a computation load. A native characteristic of the connected users in a wireless network is that they are "mobile" and their traffic requests are "bursty" in nature. The MAC layer scheduling is based on how much throughput is given to each user based on the wireless configuration, estimated channel information, user request, and user feedback. Since the base station such as a gNodeb or eNodeB is the master of the network, the scheduling decisions made by MAC layer are followed by PHY layer and the UE.

Figure 5:
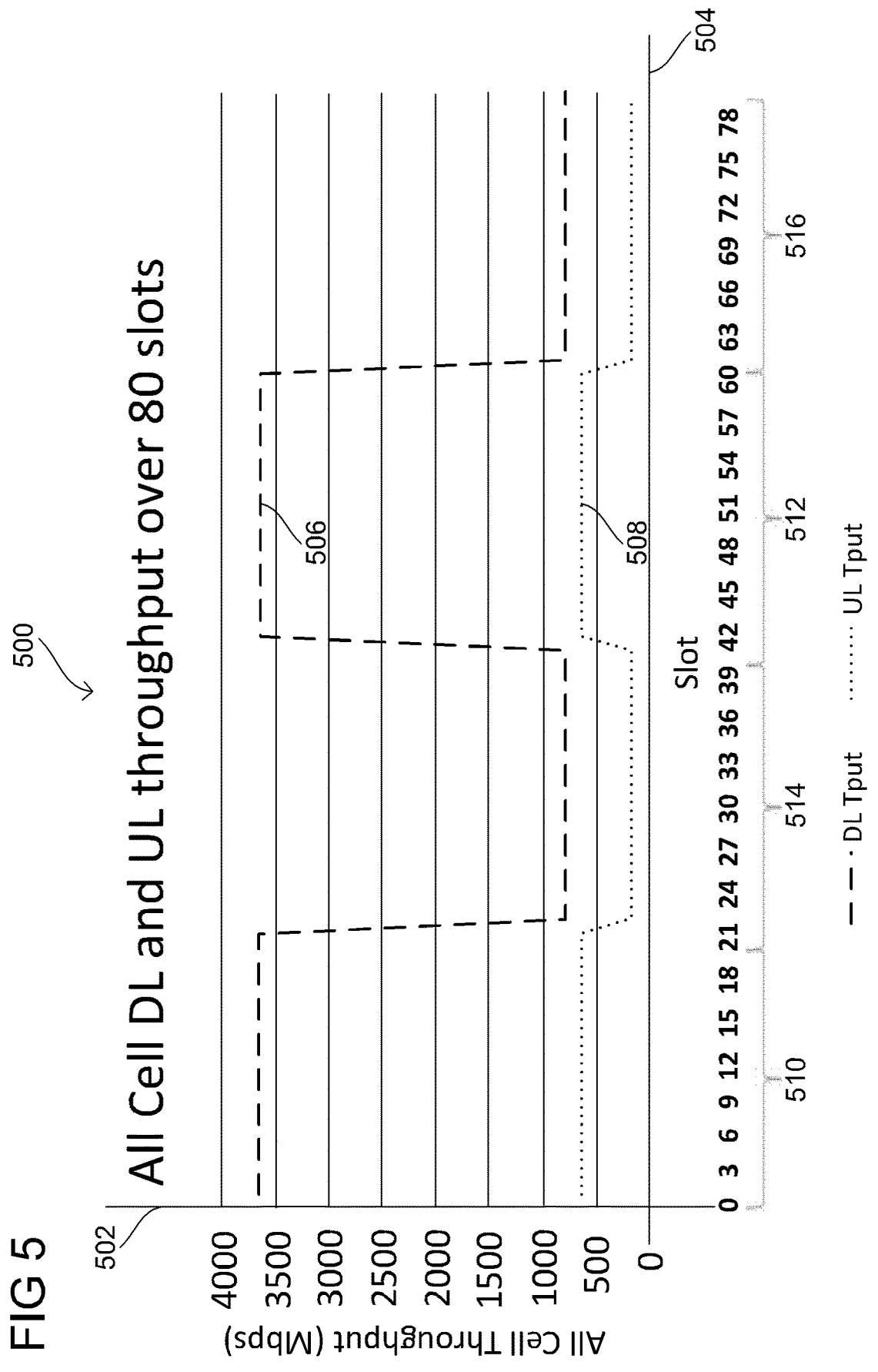
FIG. 5 shows network throughput variations over time slots.

FIG. 5 shows a chart 500 of a vRAN traffic model over 80 slots for 24 cells running on a vDU. Chart 500 shows cell throughput on the y-axis 502 and slots on the x-axis 504. Dashed line 506 represents the downlink (DL) throughput over slots 0-80. Dotted line 508 represents the uplink (UL) throughput over slots 0-80. Period 510 represents time slots 1-20, period 512 represents time slots 41-60, period 514 represents time slots 21-40, and period 516 represents time slots 61-80. As shown in FIG. 5, the throughput, or traffic workload, is not steady and fluctuates every 20 slots. For example, periods 510 and 512 show periods of heavy throughput. In contrast, periods 514 and 516 show periods of light throughput. All processor cores may be allocated to deal with the heavy throughput of slot periods 510 and 512. In contrast, not all cores are needed to deal with light throughput of slot periods 514 and 516. For example, if 10 cores are allocated to deal with the heavy throughput of periods 510 and 512, less than 10 cores need to be allocated to deal with the light throughput of periods 514 and 516. The cores that are not needed may be placed into a power saving mode. The PHY depends on the MAC scheduler to dictate which channels to process in the upcoming TTI(s). This information can come just one time slot before or multiple time slots before the actual processing time of a processing pipeline. Using this information, the PHY layer can predict how many cores are needed for an upcoming TTI and send the other cores into a sleep, or power saving, mode and reduce power consumption.

vRAN software applications may further use TDD (time division duplexing) pattern information to further predict the compute load. In 5G new radio (NR), the new spectrum allocated for wireless communication are wide bandwidth (40-100 Mhz) and vRAN network operators may deploy a TDD based network where both DL and UL traffic are divided by time slots and occupy the entire bandwidth for a given time slot. For example, in a typical TDD period format there are three D slots for DL transmission, one S slot for DL to UL switching and mixed DL and UL transmission, and one U slot for UL transmission. This time period format is often referred to as the DDDSU frame structure.

Figure 6:
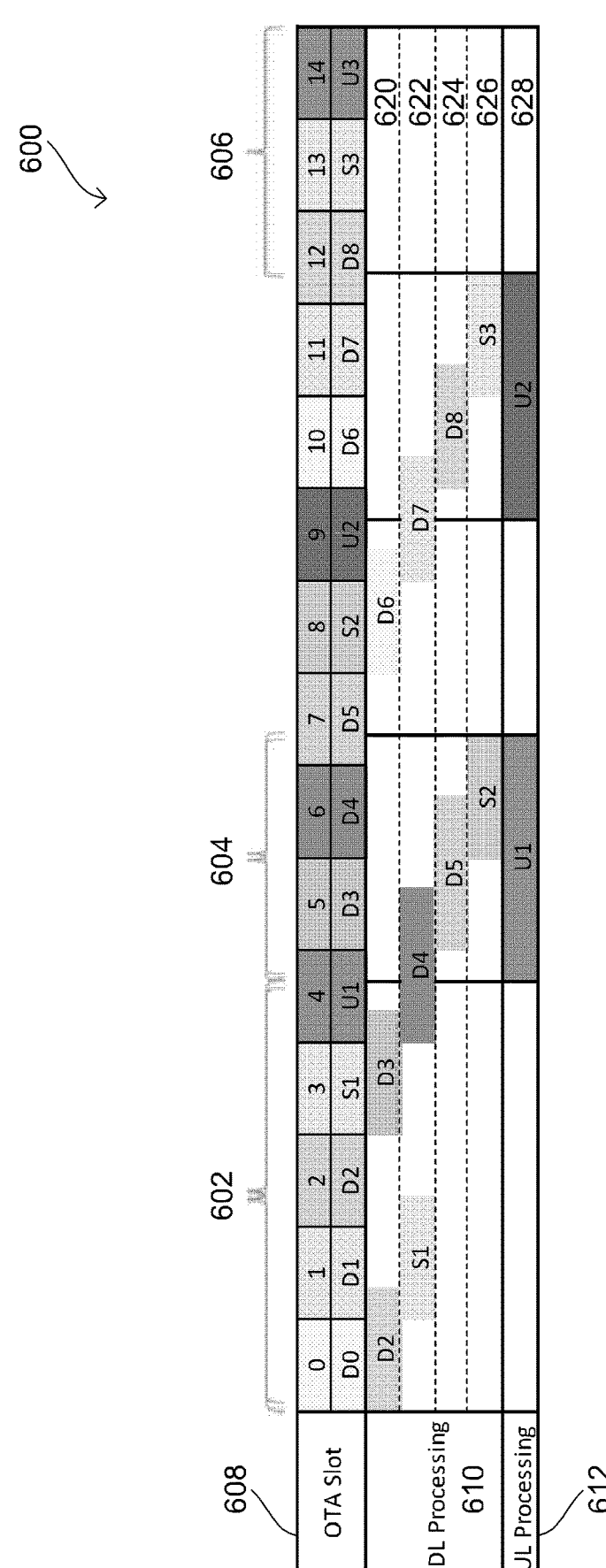
FIG. 6 shows a core utilization vs computation load.

FIG. 6 shows a table 600 of data packet processing load over time. Table 600 shows DL processing 610 and UL processing 612 across over the air (OTA) time slots 608 for a TDD based network configured for a DDDSU framework. Each row 620, 622, 624, 626, and 628 of table 600 may represent a processor core or a thread configured to control a processor core. Period 602 shows a light processing load. As shown in FIG. 6, only DL processing occurs during period 602. This may not require all available cores to be active. For example, during period 602, a subset of available cores 620 and 622 may be required to process the load. Cores 624, 626, and 628 may not be required for processing the load and may be deactivated or put into a power saving state. Period 604 shows a heavy processing load. As shown in FIG. 6, both DL and UL processing occurs in period 604. This may require all available cores to be active. For example, during period 604 cores 622, 624, 626, and 628 may be required to process the load. During 604, load is relatively high processing load for DL and UL slots. Therefore, all cores may be activated, even though they may not be 100% occupied to reduce latency. Additionally, there may be pipeline dependencies that would all need to be considered in processing the pipeline. It should be noted, that in this example, not all available cores are required to process even a heavy load. Cores 626 and 628 that were previously in a power saving state may have to be activated before period 604 occurs. Period 606 shows a no processing load. As shown in FIG. 6, no processing occurs in period 606. This may allow all available cores to be deactivated. For example, during period 606 all available cores 620, 622, 624, 626, and 628 may be deactivated and put into a power saving state.

Because the TDD format in 5G is fully configurable, the PHY layer may be designed to be flexible to handle different TDD configurations defined by the operator. It should be noted that other time period formats are possible.

Because of the processing complexity and timing requirements of the TDD format in 5G, the workload in D slots is often lighter as compared to the workload U slots. Therefore, even in busy hours such as period 604 with a heavy load, all cores are not in 100% occupied all the time as shown in FIG. 6. During light load period 602 or no load period 606, many cores may be put into a sleep state. Alternatively, in anticipation of heavy load TTIs, all processor cores may be activated.

A machine learning algorithm, such as a neural network, may be configured to predict a computation load in a vRAN environment. Processor cores may then be allocated based on the predicted computation load. The processor cores may be activated or deactivated based on whether or not they have been allocated in a power consumption profile. It should be noted that other machine learning algorithms are available to predict a compute load. The input layer of the machine learning algorithm may include information from the MAC layer.

For example, based on the scheduler information available in the MAC layer, the following information is available per TTI to be input into a machine learning algorithm:

The number of UEs scheduled, including their pairing across all physical resource blocks (PRBs).

The modulation coding scheme (MCS) for each UE.

The DL and/or UL load level.

The overall throughput being served based on symbols, resource blocks (RBs), MCS, and Layers).

The complexity of the receiver functions based on UE pairing info.

Other information from other sources which affect the data packet processing pipeline and computation load can be input into the machine learning algorithm to predict the computation load.

Additionally, Look Up Tables (LUTs) may contain computation estimates or measured values for different processing modules in the pipeline. For example, The look up table may include computation load estimates for processing a channel estimation module. The overall computation load may be estimated from the computation estimates for different modules in the LUT. The determination or prediction of the requirements for processing the full pipeline, including serial and parallel combination of modules may be based on the computation profiles of the LUT. Note that the computation profiles of the LUT may take into account the serial and parallel nature of variance modules when predicting the computation load of the shadow pipeline, such as described in FIG. 7 below.

Furthermore, a power consumption profile based on the predicted requirements for processing the pipeline may be generated. The power consumption profiles may define a schedule of which processor cores are activated and/or deactivated. The predicted computation load may be matched to a power consumption profile. For example, the computation requirements associated with the predicted computation load can be matched to a power consumption profile, based on the functional blocks in the PHY layer pipeline.

The following LUT shows an exemplary table of processing modules in a pipeline. For example, digital signal processing algorithms such as channel estimation and equalization, may consider the complexity for a PRB for a different number of layers, number of streams that DU processes, and UE mobility. The PHY pipeline may be based on CPU cycle count profiling and benchmarking.

| Num Layers | Num Streams | UE Mobility (Doppler Hz) | CPU Cycle Count |
|---|---|---|---|
| 1 | 2 | <100 | x |
| 1 | 2 | <200 | y |
| 1 | 2 | <400 | z |
| 1 | 4 | <100 | l |
| 1 | 4 | <200 | m |
| 1 | 4 | <400 | n |
| 2 | . . . | . . . | . . . |
| . . . | . . . | . . . | . . . |

Similar LUTs will capture complexity for other blocks in the pipeline such as demapper (log likelihood ratio (LLR) calculation), descrambler, FEC, etc.

Based on the MAC scheduled information for a given TTI, we can use LUTs to calculate overall compute requirements for the pipeline at a given TTI. Alternatively, a machine learning algorithm may be used to predict the computation load. Over time, the machine learning algorithm may learn the information similar to the module computation estimates stored in the LUT.

Figure 7:
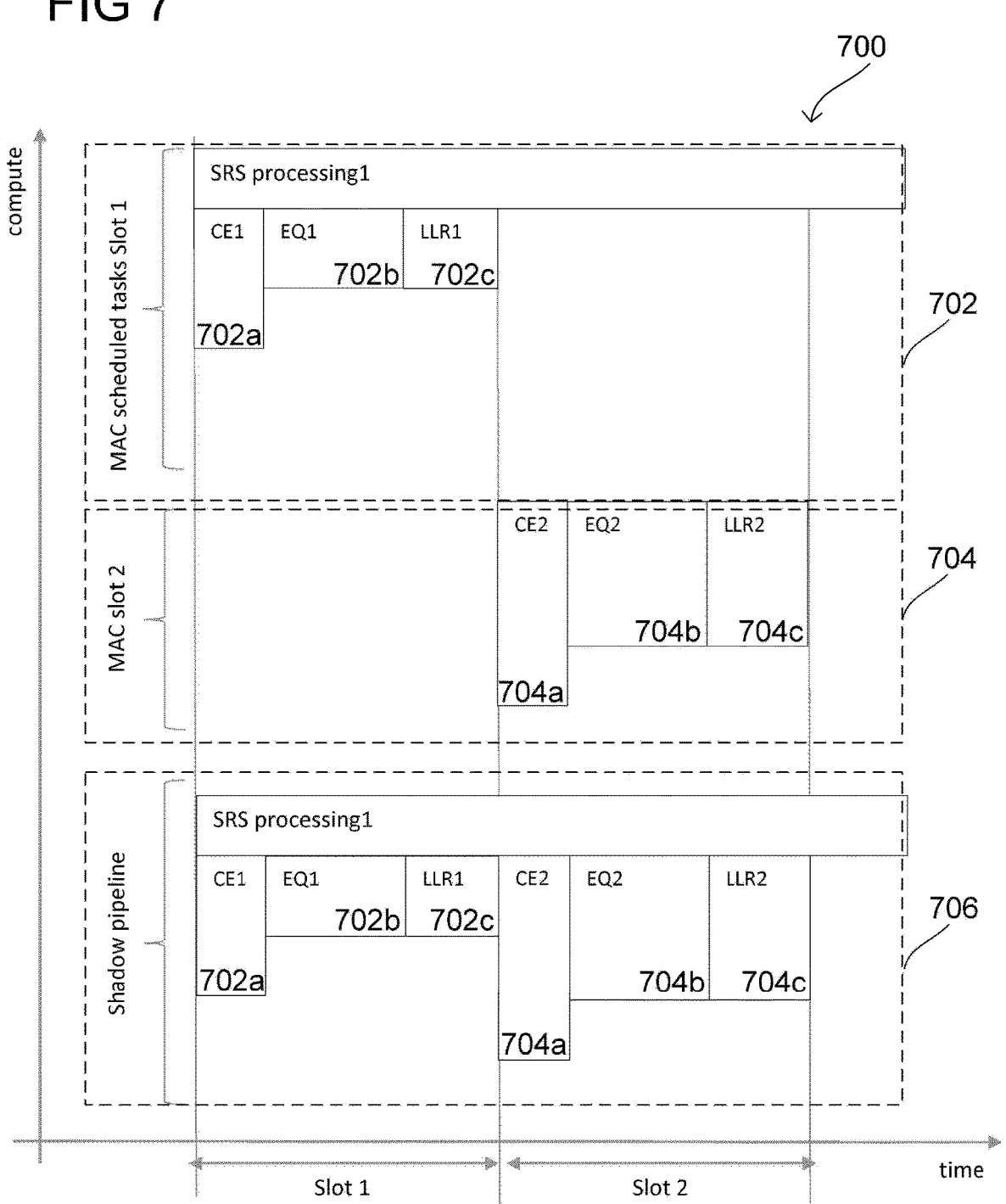
FIG. 7 shows a shadow pipeline for determining a power profile.

FIG. 7 illustrates an example of a generated shadow pipeline based on MAC schedule information 700. The generation 700 includes MAC schedule information per OTA slot. Computation profile 702 for a first time slot may include tasks 702a, 702b, and 702c. Computation profile 704 for a second time slot may include tasks 704a, 704b, and 704c. Based on the MAC schedule information, the tasks 702a, 702b, and 702c of first slot 702 and the tasks 704a, 704b, and 704c of second slot 704 may be scheduled in shadow pipeline 706. Shadow pipeline 706 does not process data, but simply calculates the expected processor cycle count profile over time by lining up computation profiles of time slots 702 and 704 on a time axis for different time slots in the pipeline. As shown in FIG. 7, computation profiles over two time slots 702 and 704 are lined up in shadow pipeline 706.

In this simplified shadow pipeline 706, the three blocks CE 702a and 704a, EQ 702b and 704b, and LLR 702c and 704c respectively, are each dependent on the previous blocks output. For example, block 702c is dependent on output from block 70b, and block 702b is dependent on block 702a. CE blocks 702a and 704a are not easily parallelizable. Therefore, CE blocks 702a and 704a are associated with a high compute rate which require relatively high computation resources. Blocks EQ 702b and 704b and LLR 702c and 704c respectively may be run in parallel, and therefore can be made to take the rest of the time in the time slot to finish with a uniform computation rate. SRS processing is a process that can be done over multiple time slots, so the computation load can be spread over a longer time.

The active 5G vRAN processing pipeline is more complex than lining up computation profiles 702 and 704. However, shadow pipeline 706 can be portioned into tasks that needs to be completed within the same slot vs tasks that may be processed over multiple slots. Dependencies where one module needs the output of another module for its processing are known. The dependencies between the blocks are considered when generating shadow pipeline 706. For example, channel estimation has to happen before equalization occurs because it uses the estimated channel to equalize received symbols. As shown the channel estimation module 702a occurs before equalization module 702b occurs in shadow pipeline 706. Other factors that impact the order of tasks per slot in a computation profile may also be considered when generating shadow pipeline 706. Calculations done in shadow pipeline 706 are simple scaling, adding numbers based on LUTs for compute kernels mentioned above, and lining up of the compute profiles as shown in FIG. 7.

Determining the cycle counts, such as those for the computation profiles shown in FIG. 7, helps to determines the power consumption required for the processing pipeline. The shadow pipeline 706 may, in part, calculate or predict the computation profile for a processing pipeline. The allocation and activation of processor cores may be based on the computation of cycle counts. For example, setting the computation mode or state of the processor cores. Allocation of cores is based on the computation capability of each core and its power characteristics with varying compute load. The allocation of cores is further based on the support required to process the estimated computation profile of a pipeline. The allocation of cores may generate an optimal power consumption profile which only activates processor cores when necessary.

The total number of active cores required are based on the calculation of the computation load for the shadow pipeline. The total number of active cores required may be further based on the task scheduling framework, such as base band unit (BBU) pooling that meet the latency requirement of the network. The total number of active cores required to satisfy network requirements may be activated to process the predicted load and any other available cores may be put into a power saving state.

Generating the shadow pipeline may further include scheduling tasks based on dependencies. For example, determining which modules need to run sequentially. Additionally, latency requirements for the network must be considered when determining the processing time for modules. This may require parallelizing processing of some modules. Other considerations may include memory and/or cache bandwidth limitations and I/O and PCIE bandwidth limitations.

LUTs may be updated based on performance readings. If performance falls below a threshold, the LUT may be updated to increase the computation profile for a given module. The task scheduling framework may also be considered to accurately project how many cores are required to support the workload.

Additionally, a scalar factor, α>1, could be introduced to scale the cycle counts from the LUTs, as a safety measure to make sure there are no performance issues. The cycle counts from the LUT can be multiplied by the scalar factor to generate the overall cycle count, or computation load, calculation for the shadow pipeline. This serves as a margin to handle inaccuracies in individual kernel cycle counts, and various platform architecture level variations, such as memory access delays when running in pipeline mode. Initially, the value of a can be expected to be large, for example 2 to 3 times, because the initial computation figures for kernels are based on standalone measurements or estimates. Over time, the system may update the cycle counts in the LUT based on measured cycle counts for compute kernels working in pipeline. The scalar factor, α, may eventually be optimized to a value closer to 1 to reduce the margin yet still handle other variations.

FIG. 8 shows a process flow 800 for determining the required number of active cores based on the predicted processing load. Process flow 800 includes receiving scheduling information 820. Scheduling information 820 may include layer 2 scheduling information which is readily available at system level. Step 802 may calculate cycle counts for each module based on scheduling information 820. Step 804 may further calculate cycle counts for the shadow pipeline, which estimates the processing pipeline based on the computation profiles of scheduled modules. For example, step 804 may accumulate the cycle counts from step 802 to generate a cycle count for the entire pipeline. Step 804 may project a computation load based on the cycle counts for the shadow pipeline, such as shadow pipeline 706. The computation load may be defined at a very fine time granularity. The fine time granularity may be on a per time slot or TTI basis. Step 806 may determine and/or allocate a number of required cores based on the computation load defined at a fine time granularity. The cores may be activated or deactivated by leveraging native power saving settings of a XPUs at the same fine time granularity of the computation load. By doing so, only the required amount of computation resources are active, and consuming power, at any given time. Step 808 processes the processing pipeline. The processing pipeline may be based on the shadow pipeline of step 804. This results in a power consumption profile that is closely matched to the estimated or predicted computation load over time. This fine grain power optimization can save power even during busy hours taking advantage of finer variations in network capacity use.

Step 810 may read production measurements from the processing pipeline 808. Step 810 may further update the computation cycle counts in LUTs based on computation load measurements of the processing pipeline. LUTs may be stored in database 812. Step 802 may further estimate the computation load based on the updated computation profiles of the LUTs in addition to the scheduling information 820.

Every XPU may have built in power saving states. Configuration of cores of the XPU may be based on a predicted core utilization based on the predicted computation load. Leveraging the various power optimization features of XPUs based on the predicted computation load may reduce power consumption.

For example, an XPU of a vRAN may include one or more power saving states. For example, a first power saving state may include changing the voltage and/or frequency levels at which a processor core runs when the core is active. Each core's frequency can be set based on application needs.

Further examples include power saving states for inactive cores. First, when cores are not running anything, they can potentially be powered off for some time to reduce power consumption. For inactive cores, exemplary power saving states may include:
keeping the core active
halting the core and stopping the clocks
halting the core, stopping the clock, and reducing the voltage
stopping the core clock, flushing the L1 and L2 caches, saving the core state, and setting the voltage to 0.

Figure 9:
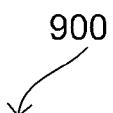
FIG. 9 shows power saving states of a processor.

FIG. 9 shows inactive core power saving states 900. Inactive power saving states 900 include power saving states 902, 904, and 906. Power saving state 902 may include keeping the core active. Power saving state 904 may include reducing the voltage to the core and halting the core clock. Power saving state 906 may include cutting off the voltage to the core, halting the core clock, halting the phase locked loop, and flushing the L1/L2 caches. It should be noted that other configurations of power saving states are possible. The power profiles may be configured to take advantage of the native power saving states of the XPU.

To make sure that an intelligent power optimization scheme does not affect performance, the power optimization must meet conditions. For example, meeting operator defined KPIs for total data throughput, total users served, and overall communication latency. Furthermore, there may be mandatory conditions from the CPU itself. For example, the sleep time needs to be configurable, as the load per TTI is varying from high to low in a short span of time (125-1000 micro-seconds). Additionally, the sleep control can be done per core and the core can put to sleep and recovered back quickly. For example, up to 10 µs. Finally, taking advantage of the XPU's native power saving states does not introduce overhead from traversing through different software layers, which reduces the overall system impact.

Processors may include a wait instruction to meet operator and processor conditions. The wait instruction can be used to minimally impact application performance and provide a reduction in power consumption.

We can expect similar features in XPUs available for configuring a vRAN solution. Hence the algorithms and methodology developed in this disclosure to reduce power is applicable to any vRAN or any virtualized PHY processing architecture where we can leverage information available, such as L2 scheduling information, to predict or estimate the compute workload before the workload is executed.

Figure 10:
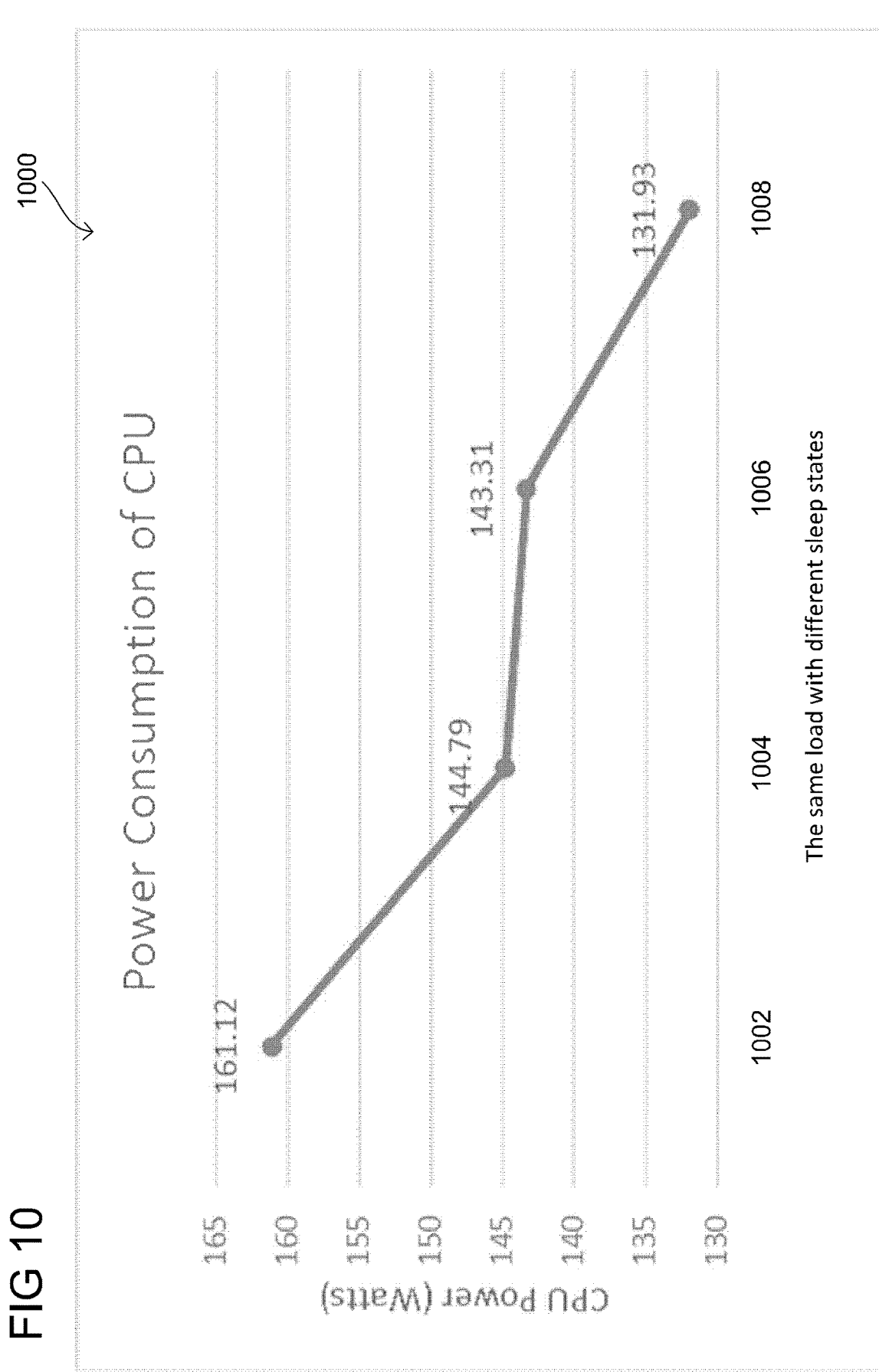
FIG. 10 shows power consumption of a processor for similar computation loads using different power saving states.

FIG. 10 shows experimentation results 1000 of using different power saving states. The process described in FIG. 8 may be implemented with a processor which includes a wait instruction available in the application space. All cores in experiment 1002 have a CPU power of 161 Watts. None of the cores in experiment 1002 are put to sleep and hence draw the most power. In experiment 1004, overall CPU power is 144 Watts. In experiment 1004, unused cores are sent into a sleep state. In experiment 1006, overall CPU power is 143 Watts. In experiment 1006, unused cores are sent into a sleep state. However, as compared to experiment 1004, the cores in experiment 1006 take advantage of a wait instruction. During idle periods, the application directly calls the wait instruction to send the cores to sleep thus bypassing OS and governor traversal. In experiment 1008, the overall CPU power is 132 Watts. In experiment 1008, algorithms are used to determine how many cores are needed per TTI to send the cores to longer periods of sleep which saves and additional 14 watts of power. For example, the algorithm described in FIG. 8.

Figure 11:
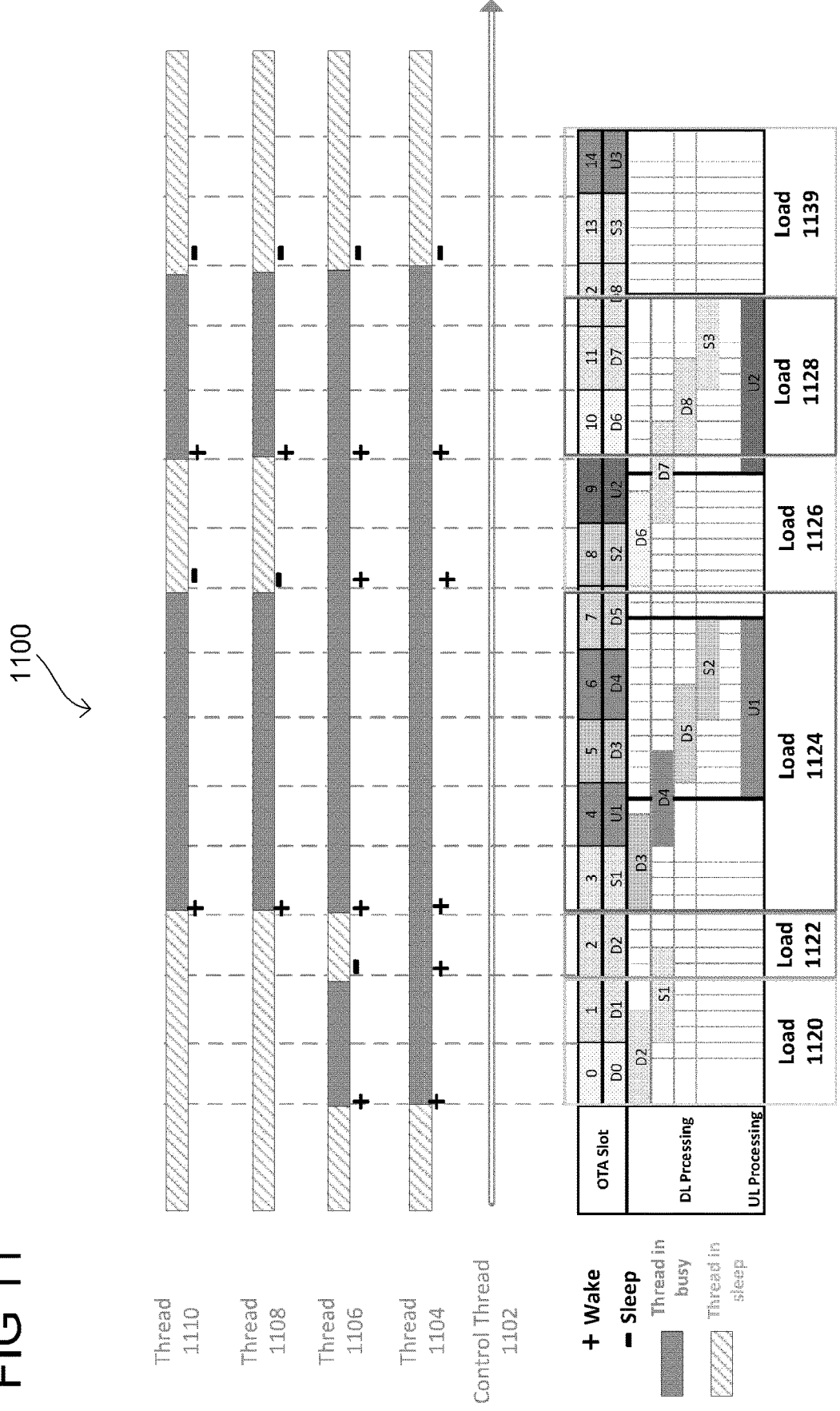
FIG. 11 shows thread activity based load activity.
Figure 12:
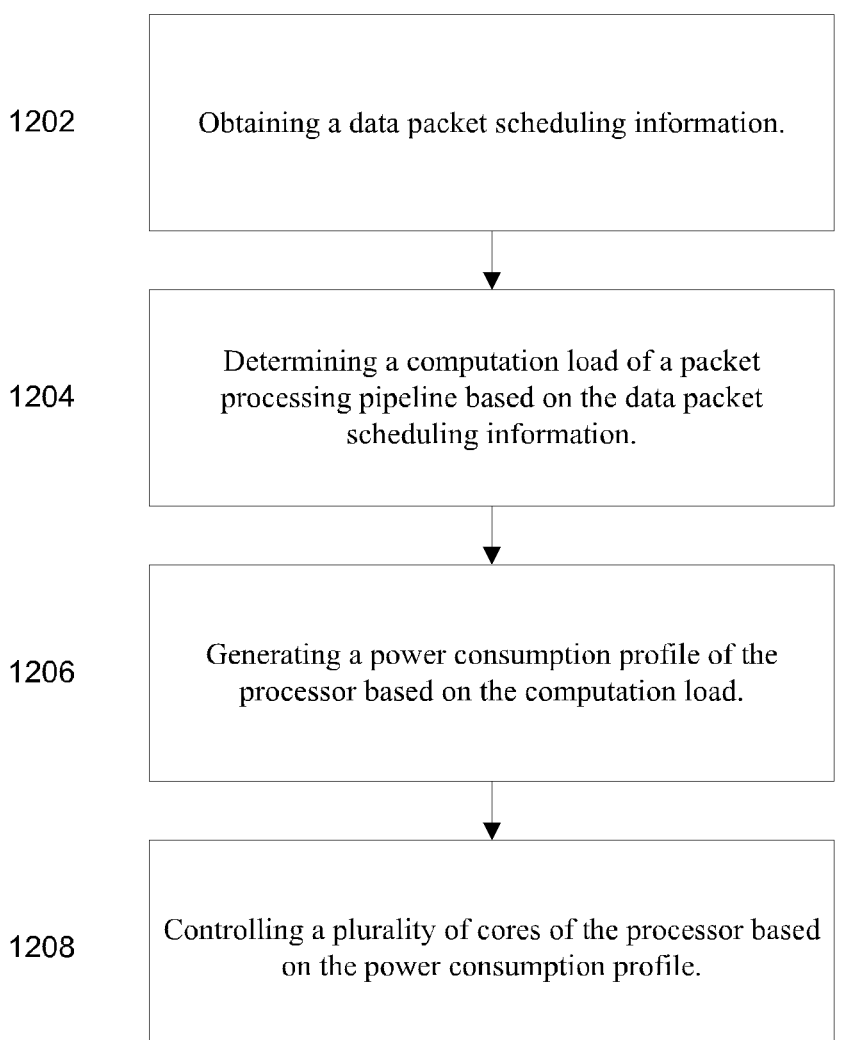
FIG. 12 shows a method of controlling processor cores according to a power profile.

FIG. 11. shows a chart 1100 of worker threads over time based on an exemplary power profile. Chart 1100 includes worker threads 1104, 1106, 1108, and 1110. The 4 worker threads 1104, 1106, 1108, and 1110 are running in the DDDSU TDD format. As shown in FIG. 11, the control thread 1102 may control cores based on the worker threads 1104, 1106, 1108, and 1110. Control thread 1102 may activate or deactivate some cores based on the thread activity. Based on the scheduling information, the predicted computation load may predict moderate load 1120 for slots 0-1, low load 1122 for slot 2, high load 1124 for slots 3-7, moderate load 1126 for slots 8-9, high load 1128 for slots 10-11, and no load 1130 for slots 12-14. For example, all the threads are busy for high load 1126 and all cores may be active for load 1126. Low load 1130 may not have any busy threads and several cores are not woken up for slots 12-14. As shown in FIG. 12, threads may be based on the predicted computation load. The cores may be controlled based on thread activity. This this may lead to a noticeable change in power consumption on systems with large pools of cores with large thermal power design (TDP) rating.

FIG. 12 illustrates an exemplary method of determining data rate based LTR duration according to some aspects. FIG. 12 shows exemplary method 1200. As shown in FIG. 12, method 1200 includes obtaining a data packet scheduling information (stage 1202); determining a computation load of a packet processing pipeline based on the data packet scheduling information; (stage 1204); generating a power consumption profile of the processor based on the computation load (stage 1206); and controlling a plurality of cores of the processor based on the power consumption profile (stage 1208).

In the following, various aspects of the present disclosure will be illustrated:

In Example 1, a mobile communication device including a processor configured to obtain a data packet scheduling information; determine a computation load of a packet processing pipeline based on the data packet scheduling information; generate a power consumption profile of the processor based on the computation load; and control a plurality of cores of the processor based on the power consumption profile.

In Example 2, the subject matter of Example 1 may optionally further include, wherein the data packet scheduling information includes a queue of data packets.

In Example 3, the subject matter of any one of Examples 1 and 2 may optionally further include, wherein the schedule of data packets is divided into a plurality of time slots.

In Example 4, the subject matter of any one of Examples 1 to 3 may optionally further include, wherein the time slot is a transmission time interval.

In Example 5, the subject matter of any one of Examples 1 to 4 may optionally further include, wherein the computation load is further based on a number of virtual radio access network users.

In Example 6, the subject matter of any one of Examples 1 to 5 may optionally further include a lookup table including a plurality of computation estimates; and further configured to match a power consumption profile to one of the plurality of computation estimates.

In Example 7, the subject matter of any one of Examples 1 to 6 may optionally further include, to determine a latency metric based on the power consumption profile of the lookup table.

In Example 8, the subject matter of any one of Examples 1 to 7 may optionally further include, to compare the latency metric with a latency threshold; and modify the matched computation estimate based on the comparison.

In Example 9, the subject matter of any one of Examples 1 to 8 may optionally further include, wherein the power consumption profile is further based on a number of physical resource blocks.

In Example 10, the subject matter of any one of Examples 1 to 9 may optionally further include, wherein the power consumption profile is further based on a modulation coding scheme.

In Example 11, the subject matter of any one of Examples 1 to 10 may optionally further include, to generate an estimated count of clock cycles of the processor based on the computation load.

In Example 12, the subject matter of any one of Examples 1 to 11 may optionally further include, wherein the estimated pipeline cycle count is separated into resource blocks.

In Example 13, the subject matter of any one of Examples 1 to 12 may optionally further include, wherein the estimated pipeline cycle count includes resource block dependencies.

In Example 14, the subject matter of any one of Examples 1 to 13 may optionally further include, wherein the estimated pipeline cycle counts are determined at least one slot before a processing pipeline.

In Example 15, the subject matter of any one of Examples 1 to 14 may optionally further include, wherein the general purpose processor further comprises a plurality of cores.

In Example 16, the subject matter of any one of Examples 1 to 15 may optionally further include, to control a state of a core of the plurality of cores, wherein the state may include a plurality of parameters.

In Example 17, the subject matter of any one of Examples 1 to 16 may optionally further include, wherein the state of the core includes a frequency parameter configured to set a frequency at which the core runs to a frequency value.

In Example 18, the subject matter of any one of Examples 1 to 17 may optionally further include, wherein the state of the core includes a voltage parameter configured to set a voltage at which the core runs to a voltage value.

In Example 19, the subject matter of any one of Examples 1 to 18 may optionally further include, wherein controlling the state of the core includes stopping a clock of the core.

In Example 20, the subject matter of any one of Examples 1 to 19 may optionally further include, wherein controlling the state of the core includes reducing the voltage value.

In Example 21, the subject matter of any one of Examples 1 to 20 may optionally further include, wherein controlling the state of the core includes setting the voltage value to 0.

In Example 22, the subject matter of any one of Examples 1 to 21 may optionally further include, wherein controlling the state of the core includes saving a core state information to a non-volatile memory.

In Example 23, the subject matter of any one of Examples 1 to 22 may optionally further include, wherein controlling the state of the core includes determining a duration of the state of the core.

In Example 24, a method including obtaining a data packet scheduling information; determining a computation load of a packet processing pipeline based on the data packet scheduling information; generating a power consumption profile of the processor based on the computation load; and controlling a plurality of cores of the processor based on the power consumption profile.

In Example 25, the subject matter of Example 24 may optionally further include, wherein the data packet scheduling information includes a queue of data packets.

In Example 26, the subject matter of any one of Examples 24 and 25 may optionally further include, wherein the schedule of data packets is divided into a plurality of time slots.

In Example 27, the subject matter of any one of Examples 24 to 26 may optionally further include, wherein the time slot is a transmission time interval.

In Example 28, the subject matter of any one of Examples 24 to 27 may optionally further include, wherein the computation load is further based on a number of virtual radio access network users.

In Example 29, the subject matter of any one of Examples 24 to 28 may optionally further include a lookup table including a plurality of power consumption profiles; and matching the computation load to one of the plurality of power consumption profiles.

In Example 30, the subject matter of any one of Examples 24 to 29 may optionally further include, determining a latency metric based on the matched power consumption profile of the lookup table.

In Example 31, the subject matter of any one of Examples 24 to 30 may optionally further include, comparing the latency metric with a latency threshold; and modifying the matched power consumption profile based on the comparison.

In Example 32, the subject matter of any one of Examples 24 to 31 may optionally further include, wherein the power consumption profile is further based on a number of physical resource blocks.

In Example 33, the subject matter of any one of Examples 24 to 32 may optionally further include, wherein the power consumption profile is further based on a modulation coding scheme.

In Example 34, the subject matter of any one of Examples 24 to 33 may optionally further include, generating an estimated count of clock cycles of the processor based on the computation load.

In Example 35, the subject matter of any one of Examples 24 to 34 may optionally further include, wherein the estimated pipeline cycle count is separated into resource blocks.

In Example 36, the subject matter of any one of Examples 24 to 35 may optionally further include, wherein the estimated pipeline cycle count includes resource block dependencies.

In Example 37, the subject matter of any one of Examples 24 to 36 may optionally further include, wherein the estimated pipeline cycle counts are determined at least one slot before a processing pipeline.

In Example 38, the subject matter of any one of Examples 24 to 37 may optionally further include, wherein the general purpose processor further comprises a plurality of cores.

In Example 39, the subject matter of any one of Examples 24 to 38 may optionally further include, controlling a state of a core of the plurality of cores, wherein the state may include a plurality of parameters.

In Example 40, the subject matter of any one of Examples 24 to 39 may optionally further include, wherein the state of the core includes a frequency parameter configured to set a frequency at which the core runs to a frequency value.

In Example 41, the subject matter of any one of Examples 24 to 40 may optionally further include, wherein the state of the core includes a voltage parameter configured to set a voltage at which the core runs to a voltage value.

In Example 42, the subject matter of any one of Examples 24 to 41 may optionally further include, wherein controlling the state of the core includes stopping a clock of the core.

In Example 43, the subject matter of any one of Examples 24 to 42 may optionally further include, wherein controlling the state of the core includes reducing the voltage value.

In Example 44, the subject matter of any one of Examples 24 to 43 may optionally further include, wherein controlling the state of the core includes setting the voltage value to 0.

In Example 45, the subject matter of any one of Examples 24 to 44 may optionally further include, wherein controlling the state of the core includes saving a core state information to a non-volatile memory.

In Example 46, the subject matter of any one of Examples 24 to 45 may optionally further include, wherein controlling the state of the core includes determining a duration of the state of the core.

In Example 47, a system including one or more devices according to Examples 1 to 23 configured to implement a method according to Examples 24 to 46.

In Example 48, one or more non-transitory computer readable media including programmable instructions thereon, that when executed by one or more processors of a device, cause the device to perform any one of the method of Examples 24 to 46.

In Example 47, a means for implementing any of the Examples 1 to 23.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented with a corresponding method. It is thus understood that a device corresponding to a method detailed herein may include one or more components configured to perform each aspect of the related method.

All acronyms defined in the above description additionally hold in all Examples included herein.

What is claimed is:

1. A mobile communication device comprising:
   a processor;
   a memory, coupled to the processor, to store instructions, which when executed by the processor, cause the processor to:
   obtain a data packet scheduling information;
   determine a computation load of a packet processing pipeline based on the data packet scheduling information;
   generate an estimated count of clock cycles based on the computation load generate a power consumption profile of the processor based on the computation load and the estimated count of clock cycles; and control a plurality of cores of the processor based on the power consumption profile.

2. The mobile communication device of claim 1, wherein the data packet scheduling information includes a queue of data packets.

3. The mobile communication device of claim 2, wherein the schedule of data packets is divided into a plurality of time slots.

4. The mobile communication device of claim 3, wherein the time slot is a transmission time interval.

5. The mobile communication device of claim 4, wherein the computation load is further based on a number of virtual radio access network users.

6. The mobile communication device of claim 5, further comprising a lookup table including a plurality of computation profiles; and wherein each of the plurality of computation profiles includes a computation estimate of a module.

7. The mobile communication device of claim 6, wherein the processor is further configured to determine a latency metric based on the power consumption profile.

8. The mobile communication device of claim 7, wherein the processor is further configured to compare the latency metric with a latency threshold; and modify at least one of the plurality of computation profiles of the lookup table.

9. The mobile communication device of claim 1, wherein the power consumption profile is further based on a number of physical resource blocks.

10. The mobile communication device of claim 1, wherein the power consumption profile is further based on a modulation coding scheme.

11. The mobile communication device of claim 1, wherein the estimated pipeline cycle count is separated into resource blocks.

12. The mobile communication device of claim 1, wherein the estimated pipeline cycle count includes resource block dependencies.

13. The mobile communication device of claim 1, wherein the estimated pipeline cycle counts are determined at least one slot before a processing pipeline.

14. The mobile communication device of claim 1, further configured to control a state of at least one of plurality of cores of the processor, wherein the state may include a plurality of parameters.

15. A method comprising:

obtaining a data packet scheduling information;

determining a computation load of a packet processing pipeline based on the data packet scheduling information;

generating an estimated count of clock cycles of a processor based on the computation load;

generating a power consumption profile of the processor based on the computation load and the estimated count of clock cycles; and controlling a plurality of cores of the processor based on the power consumption profile.

16. The method of claim 1, further comprising controlling a state of at least one of the plurality of cores, wherein the state may include a plurality of parameters.

17. The method of claim 16, wherein the state of the core includes a frequency parameter configured to set a frequency at which the core runs to a frequency value.

18. The method of claim 16, wherein the state of the core includes a voltage parameter configured to set a voltage at which the core runs to a voltage value.

19. The method of claim 16, wherein controlling the state of the core includes stopping a clock of the core.

20. A mobile communication device comprising:

a processor;

a memory, coupled to the processor, to store instructions, which when executed by the processor, cause the processor to:

obtain a data packet scheduling information;

determine a computation load of a packet processing pipeline based on the data packet scheduling information;

generate a power consumption profile of the processor based on the computation load; and control a plurality of cores of the processor based on the power consumption profile, wherein the data packet scheduling information includes a queue of data packets, wherein the data packet scheduling information includes a queue of data packets wherein the time slot is a transmission time interval, wherein the computation load is further based on a number of virtual radio access network users; and wherein the mobile communication device further comprises a lookup table including a plurality of computation profiles; and wherein each of the plurality of computation profiles includes a computation estimate of a module.

\* \* \* \* \*